Patented Nov. 11, 1952

2,617,821

UNITED STATES PATENT OFFICE 2,617,821

METHOD FOR PREPARING FORMIC ESTERS

Samuel Soloveichik, New York, N. Y.

No Drawing. Application June 30, 1951,
Serial No. 234,647

3 Claims. (Cl. 260—491)

This invention pertains to the production of formic esters by the reaction of a boric ester of an alcohol with an appropriate acid. More specifically, the invention deals with the production of formic esters of primary, secondary or tertiary alcohols.

It is a well known fact that conventional methods of esterification such as reacting an acid with the alcohol in the presence of sulphuric acid cannot be employed for the practical production of formic esters from formic acid, inasmuch as the formic acid decomposes in the presence of the sulphuric acid; without catalytic aid the reaction proceeds very slowly. For this reason, commercial production of formic acid esters is usually practiced by one of the following procedures:

(a) The alcohol, together with carbon monoxide, are passed over a suitable catalyst under conditions of high pressure and temperature, or (b) Formic acid is first converted into formamide and the latter is treated with the alcohol in the presence of an acid.

Procedure (a) is quite costly because of the necessity for carrying it out under high pressure and temperature conditions, and also because a variety of other products are produced, some of which form an azeotropic mixture with the desired formic ester, so that additional purification steps are necessary to obtain a desired purity.

Procedure (b) is also costly because of the fact that it requires the prior preparation of the amide.

For the above reasons, the cost of formic esters in commercial quantities is several times the cost of the acetic ester of the same alcohol.

It is a principal object of my invention to provide an improved method for the production of formic esters which can be carried out under ordinary conditions of temperature and pressure, and which produces a satisfactory yield of the desired formic ester in a relatively pure form. A further object of the invention is to provide such a procedure which is simple and which can be carried on in a continuous cycle, and which does not involve the preparation of the amide intermediate mentioned above. The satisfactory attainment of these objects permits the economical and rapid preparation of the desired formic esters to an extent not heretofore realized in the art.

My invention comprises first preparing the boric ester of the desired alcohol by heating the latter with boric acid, and adding the formic acid to convert the boric ester into the corresponding formic ester, according to the following reactions wherein ROH is the desired alcohol and wherein R is an alkyl, aralkyl or cyclic radical:

(I)  $3ROH + H_3BO_3 \rightarrow 3H_2O + R_3BO_3$ (II) $R_3BO_3 + 3HCOOH \rightarrow 3HCOOR + H_3BO_3$ The process may be a continuous one, since the boric acid set free by the reaction may be recovered for reuse in the production of the boric ester which serves as the intermediate in the process. The reaction (II) goes forward rapidly at ordinary pressure, slightly elevated temperatures (100–130 degrees C.) and without the necessity of employing catalysis. The reaction between the boric ester and the formic acid takes place with ease after refluxing the mixture for a period ranging from ½ to 3 hours.

Obviously, the boric ester intermediate could equally well be prepared by alcoholysis, for example by heating a boric ester of a given alcohol with a different alcohol according to $$R_3BO_3 + 3R'OH \rightarrow R'_3BO_3 + 3ROH$$

where R and R' represent different radicals which may be alkyl, aralkyl or cyclic.

The following examples are given of the practice of the invention:

Example A 50 grams of 88% formic acid (44 grams in terms of 100% acid) and 55 grams of triethyl borate were first refluxed for one hour at a bath temperature ranging from 100 to 130 degrees C., and the reaction mixture was then subjected to distillation. The yield was 70 grams of ethyl formate, which amounts to a 99% yield calculated on the basis of formic acid employed.

Example B 69 grams of tributylborate and 22 grams of 88% formic acid (19.4 grams in terms of 100% acid) were refluxed for two hours at a temperature ranging from 100 to 145 degrees C., after which the reaction mixture was distilled and the distillate washed with water containing sodium carbonate in solution to remove traces of unconverted formic acid. The product was then dried and distilled, and yielded 40 grams of butyl formate, corresponding to a 93% yield.

Example C 22.5 grams of 88% formic acid and 60 grams of cyclohexanyl borate were refluxed for two hours at a bath temperature from 100 to 160 degrees C., and the reaction mixture subjected to vacuum distillation. The distillate was washed with water, dried, and again distilled, yielding 48 grams of cyclohexanyl formate, amounting to an 87% yield. The cyclohexanyl borate was prepared by heating tributyl borate with cyclohexanol, in a conventional procedure.

I claim:

1. The method of producing formic esters, comprising reacting a boric ester of an alcohol with formic acid and separating the formic ester thus formed.

2. The method of producing formic esters, comprising reacting formic acid with an ester of boric acid formed from an alcohol of the formula ROH wherein R is a radical of the group consisting of alkyl, aralkyl and cyclic radicals.

3. The continuous method of producing formic esters comprising esterifying boric acid with an alcohol, adding formic acid to the boric ester thus formed thereby forming an ester of formic acid and liberating boric acid, separating the ester of formic acid from the liberated boric acid and thereafter re-esterifying the same.

SAMUEL SOLOVEICHIK.

REFERENCES CITED

The following references are of record in the file of this patent:

UNITED STATES PATENTS

| Number | Name | Date |
|---|---|---|
| 1,668,797 | Bannister | May 8, 1928 |
| 2,079,068 | Herrmann | May 4, 1937 |
| 2,088,935 | Vaughn | Aug. 3, 1937 |
| 2,413,889 | Rehberg et al. | Jan. 7, 1947 |